(12) United States Patent
Esaki

(10) Patent No.: US 8,009,738 B2
(45) Date of Patent: Aug. 30, 2011

(54) DATA HOLDING APPARATUS

(75) Inventor: Kotaro Esaki, Hirakata (JP)

(73) Assignee: Panasonic Corporation, Osaka (JP)

( * ) Notice: Subject to any disclaimer, the term of this patent is extended or adjusted under 35 U.S.C. 154(b) by 1608 days.

(21) Appl. No.: 11/322,241

(22) Filed: Jan. 3, 2006

(65) Prior Publication Data

US 2006/0153302 A1 Jul. 13, 2006

(30) Foreign Application Priority Data

Jan. 11, 2005 (JP) ................. 2005-004283

(51) Int. Cl.
*H04B 1/66* (2006.01)
(52) U.S. Cl. .......... 375/240.24; 375/240.14; 375/240.18
(58) Field of Classification Search ................. 375/240, 375/240.12–240.17, 240.26, 240.24
See application file for complete search history.

(56) References Cited

U.S. PATENT DOCUMENTS

| | | | |
|---|---|---|---|
| 5,841,793 A * | 11/1998 | Fukuda | 714/752 |
| 6,366,317 B1 | 4/2002 | Mattison et al. | |
| 2004/0105500 A1 | 6/2004 | Hosogi et al. | |
| 2006/0133494 A1* | 6/2006 | Saxena et al. | 375/240.16 |
| 2007/0002948 A1 | 1/2007 | Shibahara et al. | |

FOREIGN PATENT DOCUMENTS

| | | |
|---|---|---|
| JP | 64-55988 | 3/1989 |
| JP | 6-217286 | 8/1994 |
| JP | 2003-296724 | 10/2003 |
| JP | 2005-57750 | 3/2005 |

OTHER PUBLICATIONS

ITU-T Recommendation H.262 (International Standard ISO/IEC 13818-2:2000).
English language Abstract of JP 2005-57750, Mar. 3, 2005.
English language Abstract of JP 2003-296724, Oct. 17, 2003.
English language Abstract of JP 6-217286, Aug. 5, 1994.
English language Abstract of JP 64-55988, Mar. 2, 1989.

* cited by examiner

*Primary Examiner* — Benny Tieu
*Assistant Examiner* — Eric A Rust
(74) *Attorney, Agent, or Firm* — Greenblum & Bernstein, P.L.C.

(57) ABSTRACT

A data holding apparatus of the present invention is a data holding apparatus a data holding apparatus used for image processing in which an image is coded or decoded, on a macroblock basis, based on a field structure or a frame structure selected on a macroblock pair basis. This data holding apparatus includes: a current register which holds a parameter set of a current macroblock to be coded or decoded; and registers which respectively hold parameter sets of macroblocks having neighboring relationships with a current macroblock, and at least one of the registers selectively holds, in sequence, parameter sets of respective different macroblocks having the neighboring relationships, one parameter set at a time.

7 Claims, 12 Drawing Sheets

FIELD STRUCTURE (TOP)

FIELD STRUCTURE (BOTTOM)   FRAME STRUCTURE

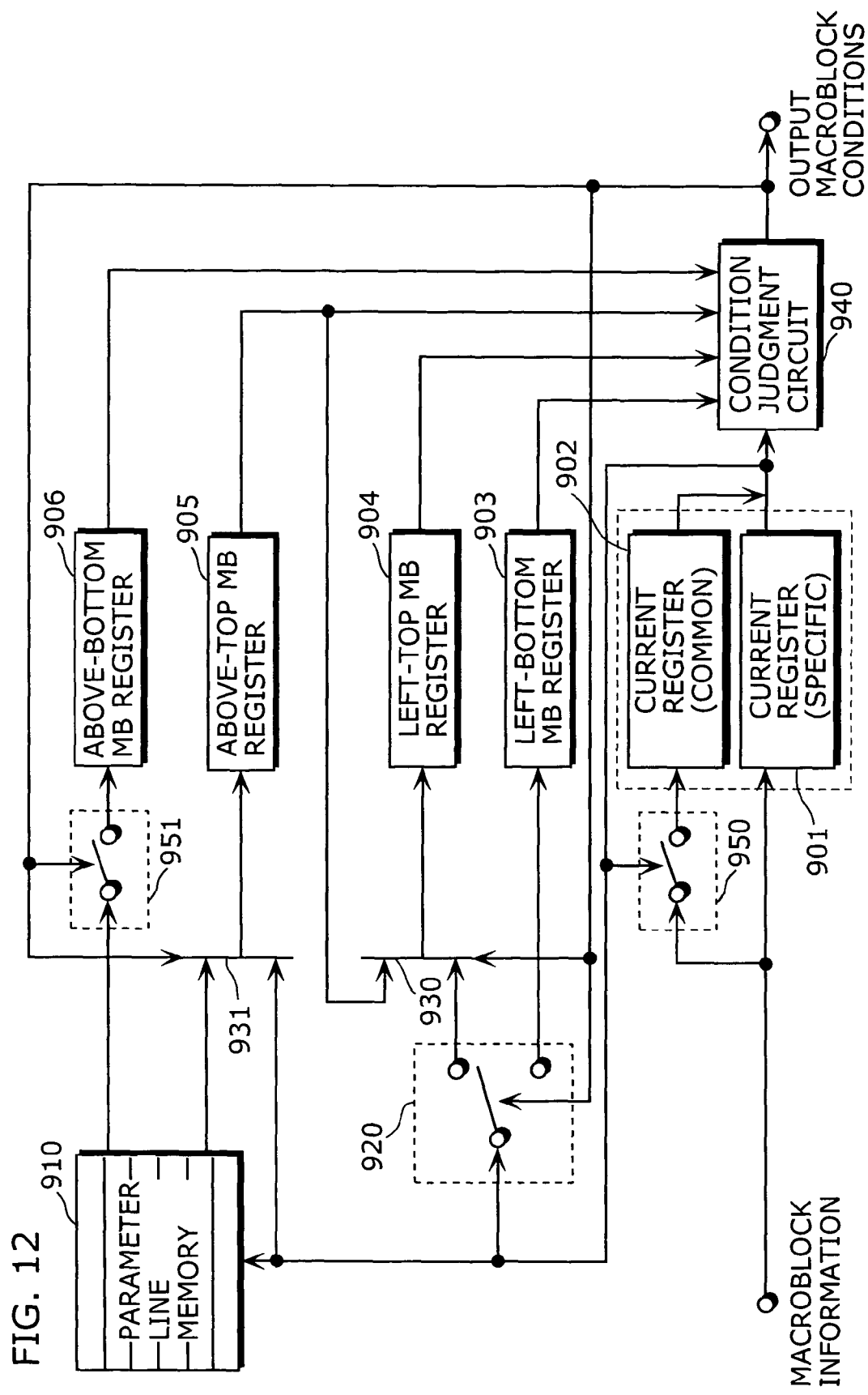

US 8,009,738 B2

DATA HOLDING APPARATUS

BACKGROUND OF THE INVENTION (1) Field of the Invention

The present invention relates to a data holding apparatus used for an image coding apparatus and an image decoding apparatus which respectively codes and decodes an image on a macroblock basis while switching a field structure and a frame structure adaptively on a macroblock pair basis.

(2) Description of the Related Art

FIG. 1 is a block diagram showing a structure of a conventional data holding apparatus included in an image coding apparatus and an image decoding apparatus which are compliant with the MPEG-2 standard (see INTERNATIONAL STANDARD ISO/IEC 13818-2: 2000, "Information technology-Generic coding of moving pictures and associated audio information: Video"). In FIG. 1, the data holding apparatus includes registers 501 to 503, a parameter line memory 504 and a condition judgment circuit 505.

The register 501 holds a parameter set of a current macroblock to be coded or decoded (hereinafter referred to as a current macroblock). FIG. 2 shows the coding or decoding order of macroblocks. As shown in FIG. 2, macroblocks which make up a single picture are coded one by one by scanning the horizontal macroblock lines in a direction from left to right and from top to bottom.

The registers 502 and 503 hold parameter sets of previously coded or decoded macroblocks. More specifically, the register 502 holds the parameter set of the macroblock immediately left of a current macroblock, while the register 503 holds the parameter set of the macroblock immediately above the current macroblock, as shown in FIG. 3. Here, a parameter set includes motion vectors of a macroblock and the like, and indicates the conditions for coding or decoding the macroblock.

The parameter line memory 504 holds parameter sets of previously coded or decoded macroblocks. More specifically, it holds the parameter sets of respective macroblocks in the macroblock line immediately above the macroblock line which contains a current macroblock. The parameter line memory 504 holds parameter sets of previously coded or decoded macroblocks because a current macroblock refers to a previously coded or decoded macroblock contained in the above neighboring macroblock line. Here, a macroblock located right to the current macroblock is a macroblock to be coded or decoded next. A macroblock in a macroblock line just below the macroblock line of the current macroblock is to be coded or decoded after the coding or decoding of macroblocks corresponding to one macroblock line.

The condition judgment circuit 505 judges the coding or decoding conditions for a current macroblock based on the parameter sets stored in the registers 501 to 503.

In the data holding apparatus shown in FIG. 1, before a current macroblock is processed (coded or decoded), the parameter set of the most recently processed macroblock is transferred, as the parameter set of the left neighboring macroblock, from the register 501 to the register 502 for the left neighboring macroblock. At the same time, the parameter set of the macroblock, which has already been processed for one macroblock line before the processing of the current macroblock and saved in the parameter line memory 504, is read out as the parameter set of the above neighboring macroblock and stored in the register 503. A current macroblock is processed (coded or decoded) based on a parameter set of the current macroblock, stored in the register 501, a parameter set of the left neighboring macroblock, stored in the register 502, and a parameter set for the above neighboring macroblock, stored in the register 503. The condition judgment circuit 505 judges the conditions for coding (or decoding) the current macroblcok using the above parameters.

As described above, after the coding (or decoding) of a current macroblock has been completed, the parameter set of the current macroblock, stored in the register 501, is transferred to the register 502 because such parameter set will be needed again as the parameter set of the left neighboring macroblock when the macroblock immediately right of the current macroblock becomes a current macroblock to be coded (or decoded) next. At the same time, the parameter set of the current macroblock, stored in the register 501, is saved in the parameter line memory 504 because it will be needed again as the parameter set of the above neighboring macroblock when the macroblock immediately below the current macroblock becomes a current macroblock to be coded (or decoded) next.

A series of processing as mentioned above is repeated on a macroblock basis for coding (or decoding) of the whole picture.

SUMMARY OF THE INVENTION

However, the conventional data holding apparatus cannot be used for the macroblock-adaptive frame/field coding (or decoding) in which the frame/field structures can be switched adaptively for each vertical pair of macroblocks. In addition, if a data holding apparatus includes the same number of registers as that of the neighboring macroblocks as is the case with the conventional one, the problem is that not only the number of registers but also the circuit size of the apparatus increase. This problem is described below in detail.

As shown in FIG. 2, in the conventional image coding (or decoding) processing, picture coding (or decoding) is basically performed on a macroblock basis. In recent years, the ISO/IEC Moving Picture Experts Group and the ITU-T Video Coding Experts Group have jointly made efforts to standardize MPEG-4 AVC and ITU H.264 as the next-generation image coding scheme with the goal of further enhancing image coding efficiency. One of the features of this new image coding technique is that the above-mentioned picture coding can be performed basically on a basis of a vertical pair of macroblocks as shown in FIG. 5. In such coding (or decoding) per macroblock pair, macroblocks are processed in the order of raster scanning in which a vertical transition within a pair of macroblocks is prioritized. In addition, if such coding per macroblock pair is employed, a frame structure and a field structure can be switched adaptively for each vertical pair of macroblocks in a picture. FIG. 6 shows one example where macroblock pairs of both the frame structure and the field structure are mixed in a picture. In FIG. 6, a vertically hatched region indicates a top macroblock in a macroblock pair of the field structure, namely a macroblock in a top field, while a horizontally hatched region indicates a bottom macroblock in a macroblock pair of the field structure, namely a macroblock in a bottom field. A vertically and horizontally hatched region indicates a macroblock pair of the frame structure.

Compared with the conventional coding, such macroblock-adaptive frame/field coding increases the number of reference macroblocks which have neighboring relationship with a current macroblock and whose parameters can be used for coding the current macroblock, and therefore renders the neighboring relationship more complicated.

FIGS. 7A to 7H show various relationships between a current macroblock and macroblocks, each having such neighboring relationship. Arrows in these diagrams indicate macroblocks whose parameters are referred to by the current macroblock. Each of FIGS. 7A to 7D shows the case where a macroblock pair containing a current macroblock has a frame structure, while each of FIGS. 7E to 7H shows the case where a macroblock pair containing a current macroblock has a field structure. As shown in FIGS. 7A and 7B, in the case where a macroblock pair containing a current macroblock has a frame structure and the left neighboring macroblock pair also has a frame structure, the immediately left macroblock in the left neighboring macroblock pair is a reference macroblock. Similarly, in the case where a macroblock pair containing a current macroblock has a frame structure and the above neighboring macroblock pair also has a frame structure, the immediately above macroblock is a reference macroblock.

As shown in FIG. 7C, in the case where a macroblock pair containing a current macroblock has a frame structure and the left neighboring macroblock pair has a field structure, both the top and bottom macroblocks in the left neighboring macroblock pair are reference pictures. In addition, in the case where a macroblock pair containing a current macroblock has a frame structure, the above neighboring macroblock pair has a field structure and the current macroblock is the top macroblock in the pair, both the top and bottom macroblocks in the above neighboring macroblock pair are reference macroblocks.

As shown in FIG. 7D, in the case where a macroblock pair containing a current macroblock has a frame structure and the left neighboring macroblock pair has a field structure, both the top and bottom macroblocks in the left neighboring macroblock pair are reference macroblocks. In addition, in the case where a macroblock pair containing a current macroblock has a frame structure and the current macroblock is the bottom macroblock in the pair, the top (immediately above) macroblock in the same pair is a reference macroblock.

As shown in FIGS. 7E and 7F, in the case where a macroblock pair containing a current macroblock has a field structure and the left neighboring macroblock pair has a frame structure, both the top and bottom macroblocks in the left neighboring macroblock pair are reference macroblocks. In addition, in the case where a macroblock pair containing a current macroblock has a field structure and the above neighboring macroblock pair has a frame structure, the bottom macroblock in the above neighboring macroblock pair is a reference macroblock.

As shown in FIG. 7G, in the case where a macroblock pair containing a current macroblock has a field structure and the left nighboring macroblock pair also has a field structure, the immediately left macroblock is a reference macroblock. In addition, in the case where a macroblock pair containing a current macroblock has a field structure, the above neighboring macroblock pair also has a field structure and the current macroblock is the top macroblock in the pair, the top macroblock in the above neighboring macroblock pair is a reference macroblock.

As shown in FIG. 7H, in the case where a macroblock pair containing a current macroblock has a field structure and the left neighboring macroblock pair also has a field structure, the immediately left macroblock is a reference macroblock. In addition, in the case where a macroblock pair containing a current macroblock has a field structure, the above neighboring macroblock pair also has a field structure and the current macroblock is the bottom macroblock in the pair, the bottom macroblock in the above neighboring macroblock pair is a reference macroblock.

As described above, compared with the conventional coding, the above new image coding technique aiming at further enhancement of coding efficiency increases the number of reference macroblocks which have neighboring relationship with a current macroblock and whose parameters can be used for coding the current macroblock, and therefore increases the number of parameter sets of the neighboring macroblocks. Therefore, the conventional data holding apparatus shown in FIG. 1 cannot be used for such new coding scheme.

FIG. 8 shows a structure of a data holding apparatus, when assuming that such conventional data holding apparatus includes the corresponding number of registers to that of macroblocks which have neighboring relationship with a current macroblock. The data holding apparatus shown in FIG. 8 should include registers 601 to 607, a switch 608, a selector 609, a condition judgment circuit 610 and a parameter line memory 611. Here, the register 601 holds a parameter set of a current macroblock. The register 602 holds a parameter set of a bottom macroblock in a left neighboring macroblock pair. The register 603 holds a parameter set of a top macroblock in a left neighboring macroblock pair. The register 604 temporarily holds, in advance, a parameter set which should be stored in the register 603 for the processing of the next macroblock. The register 605 holds a parameter set of a macroblock immediately above a current macroblock. The register 606 holds a parameter set of a bottom macroblock in an above neighboring macroblock pair. The register 607 holds a parameter set of a top macroblock in an above neighboring macroblock pair. This data holding apparatus includes seven registers (601 to 607), namely, four more registers than those in the data holding apparatus shown in FIG. 1. As such, there is a problem that in order to support macroblock pair based processing, a data holding apparatus needs to have a significantly increased number of registers and thus its circuit size also increases.

In order to solve the above problem, it is an object of the present invention to provide a data holding apparatus, an image coding apparatus and an image decoding apparatus which are used for image coding and decoding processing while switching a frame structure and a field structure adaptively on a macroblock pair basis, and thus suppressing the increase in circuit size.

In order to achieve the above object, a data holding apparatus of the present invention is a data holding apparatus used for image processing in which an image is coded or decoded, on a macroblock basis, based on a field structure or a frame structure selected on a macroblock pair basis, the data holding apparatus including: a current register which holds a parameter set of a current macroblock to be coded or decoded; and registers which respectively hold parameter sets of macroblocks having neighboring relationships with a current macroblock, wherein at least one of the registers selectively holds, in sequence, parameter sets of respective different macroblocks having the neighboring relationships, one parameter set at a time.

In the conventional data holding apparatus, a single register holds a single parameter set of a macroblock. On the contrary, in the data holding apparatus according to the above structure, a single register selectively holds, in sequence, a plurality of parameter sets of macroblocks. In other words, at least one of the registers can be used, by time-sharing, for holding a plurality of parameter sets of macroblocks. Therefore, it becomes possible to reduce the number of registers in a data holding apparatus and thus suppress the increase in circuit size.

Here, one of the registers may hold (a) a parameter set of an above neighboring macroblock with respect to a current macroblock in the case where the current macroblock is a bottom macroblock in a macroblock pair, and (b) a parameter set of a top macroblock in an above neighboring macroblock pair with respect to a current macroblock in the case where the current macroblock is a top macroblock in a macroblock pair.

According to this structure, the parameter sets held in the register by time-sharing are: a parameter set of an above neighboring macroblock with respect to a current macroblock; and a parameter set of a top macroblock in an above neighboring macroblock pair with respect to a current macroblock. The register can hold selectively one of these parameter sets depending on the position of a current macroblock in a macroblock pair (namely, whether the current macroblock is the top macroblock or the bottom macroblock in the pair).

Here, the registers may include: a first register which selectively holds one of (a) a parameter set of a top macroblock in an above neighboring macroblock pair with respect to a current macroblock, and (b) a parameter set of a top macroblock in a current macroblock pair containing a current macroblock; a second register which holds a parameter set of a bottom macroblock in an above neighboring macroblock pair with respect to a current macroblock; a third register which holds a parameter set of a top macroblock in a left neighboring macroblock pair with respect to a current macroblock; and a fourth register which holds a parameter set of a bottom macroblock in a left neighboring macroblock pair with respect to a current macroblock, and the first register may hold (a) the parameter set of the top macroblock in the current macroblock pair in the case where the current macroblock is a bottom macroblock in the current macroblcok pair, and (b) the parameter set of the top macroblock in the above neighboring macroblock pair in the case where the current macroblock is a top macroblock in the current macroblock pair.

In contrast to the data holding apparatus including seven registers shown in FIG. 8, the data holding apparatus according to the above structure includes only five registers (the first to fourth registers and the current register). Therefore, it becomes possible to suppress the increase in circuit size.

Here, a current macroblock repeats a first transition and a second transition alternately, the first transition is a transition of a current macroblock from a top macroblock to a bottom macroblock in a macroblock pair, and the second transition is a transition of a current macroblock from a bottom macroblock in a macroblock pair to a top macroblock in a right neighboring macroblock pair. And the data holding apparatus may further include: a parameter memory which holds parameter sets of at least two macroblock lines of coded or decoded macroblocks; and a first selector which selects (a) at the first transition, the parameter set outputted from the current register, and (b) at the second transition, a parameter set of a top macroblock in an above neighboring macroblock pair with respect to a macroblock to be coded or decoded immediately after the second transition, from among the parameter sets held in the parameter memory, and outputs the selected parameter set to the first register.

According to this structure, the parameter set outputted from the current register via the first selector is transferred to the first register at the first transition. Therefore, it becomes possible to reuse the parameter set stored in the current register at the first transition. Since the parameter set is reused without going through the memory (namely, it is transferred directly from the current register), it can be transferred at a high speed.

Here, the above-mentioned data holding apparatus may further include a second selector which selects (a) at the first transition, the parameter set outputted from the first register, and (b) at the second transition, a parameter set of a top macroblock in a left neighboring macroblock pair with respect to a macroblock to be coded or decoded immediately after the second transition, from among the parameter sets held in the parameter memory, and outputs the selected parameter set to the third register.

According to this structure, the parameter set outputted from the first register via the second selector is transferred to the third register at the first transition. Therefore, it becomes possible to reuse the parameter set stored in the first register at the first transition. Since the parameter set is reused without going through the memory (namely, it is transferred directly from the first register), it can be transferred at a high speed.

Here, the current register may further hold a parameter set of a non-current macroblock in a current macroblock pair containing a current macroblock. And the data holding apparatus may further include: a parameter line memory which holds parameter sets of at least two macroblock lines of coded or decoded macroblocks; a control circuit which generates, for each current macroblock pair, a timing signal for specifying horizontal processing or vertical processing in coding or decoding processing; and a selector which selects the current register which holds the parameter sets in the current macroblock pair, according to the timing signal from the control circuit, and then selects parameter sets of an above neighboring macroblock pair with respect to the current macroblock pair, from among the parameter sets held in the parameter line memory, and the registers may hold the parameter sets of the macroblock pair selected by the selector.

According to this structure, the current register holds the parameter sets of two macroblocks in a macroblock pair containing a current macroblock, namely, it holds parameter sets per macroblock pair, and each of other registers also holds parameter sets per macroblock pair.

Here, the registers may include: a first register which holds a parameter set of a top macroblock among the parameter sets of the macroblock pair selected by the selector; and a second register which holds a parameter set of a bottom macroblock among the parameter sets of the macroblock pair selected by the selector.

According to this structure, the first register can be used, in sequence, for both a top macroblock in a left neighboring macroblock pair and a top macroblock in an above neighboring macroblock pair, while the second register can be used, in sequence, for both a bottom macroblock in a left neighboring macroblock pair and a bottom macroblock in an above neighboring macroblock pair.

Here, a parameter set includes parameters common to two macroblocks in a macroblock pair and parameters specific to each of the two macroblocks, and the current register may have: a common register which holds the common parameters; and a specific register which holds the specific parameters, and the data holding apparatus may further include a switch which turns off to stop data input into said common register at the first transition and turns on to allow the data input at the second transition.

According to this structure, specific parameters are renewed on a macroblock basis, while common parameters are renewed on a macroblock pair basis. Therefore, it becomes possible to reduce the wasteful data transfer. It is also possible to prevent the common parameters from being overwritten with wrong parameters.

Since an image coding apparatus and an image decoding apparatus of the present invention include the same units as those in the above data holding apparatus, the description thereof is not repeated here.

As described above, according to the data holding apparatus of the present invention, at least one register can be used for holding a plurality of parameter sets of macroblocks. Therefore, it becomes possible to achieve a data holding apparatus including a smaller number of registers and thus suppress the increase in circuit size.

In addition, since parameter sets are transferred, for reuse thereof, between registers without going through a memory, such parameter sets can be transferred at a high speed.

Furthermore, it is possible to reduce the wasteful data transfer for the parameters common to a macroblock pair, and therefore speed up such data transfer.

As further information about technical background to this application, the disclosure of Japanese Patent Application No. 2005-004283 filed on Jan. 11, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 12 is a diagram showing a structure of a data holding apparatus in a third embodiment of the present invention.

DESCRIPTION OF THE PREFERRED EMBODIMENT(S)

First Embodiment

Figure 9:
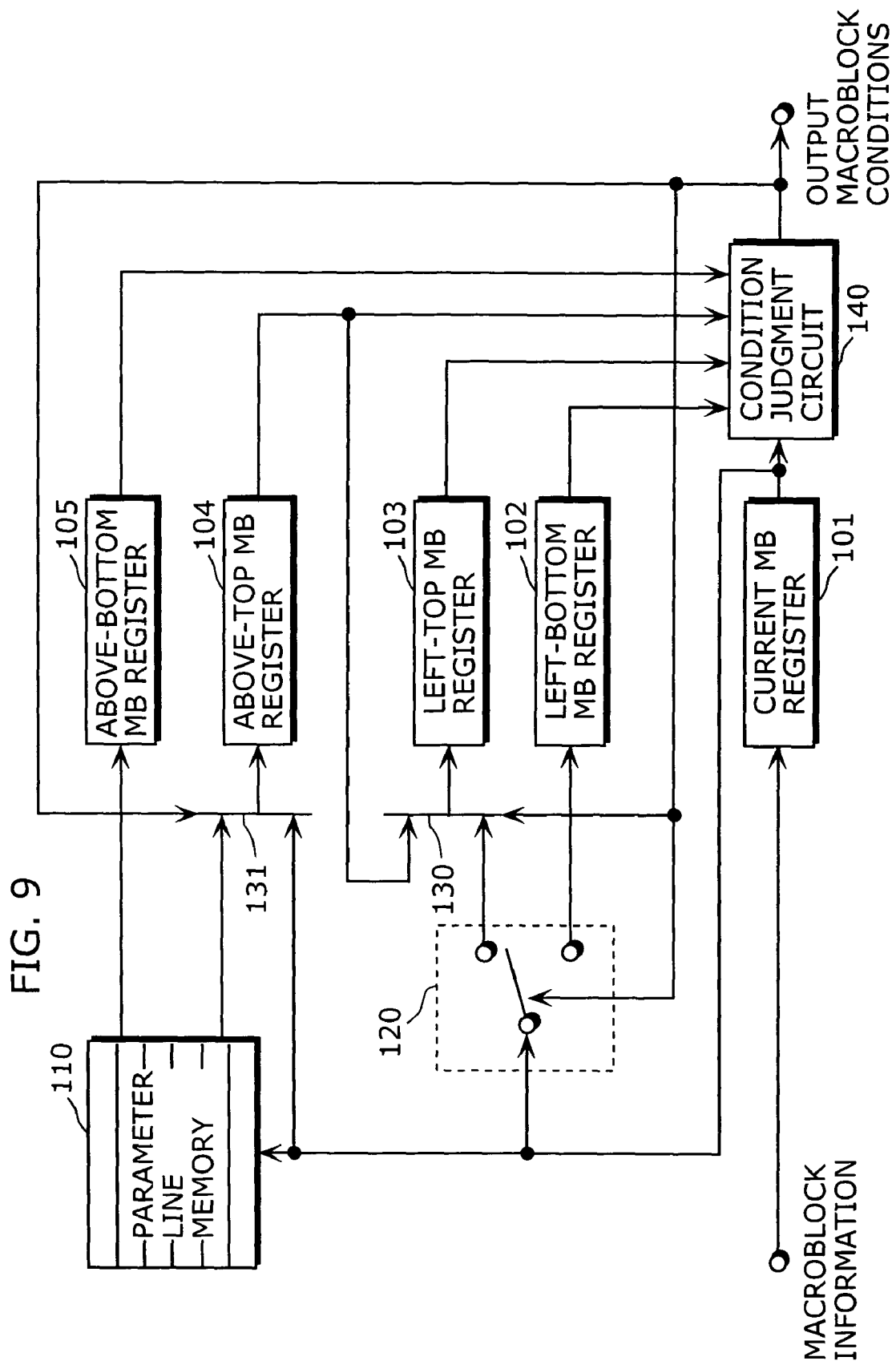
FIG. 9 is a diagram showing a structure of a data holding apparatus in a first embodiment of the present invention.

FIG. 9 is a diagram showing a structure of a data holding apparatus in the first embodiment of the present invention. This data holding apparatus includes a register 101 for a current macroblock (current MB register), a register 103 for a top macroblock in a left neighboring marcoblock pair (left-top MB register), a register 102 for a bottom macroblock in a left neighboring macroblock pair (left-bottom MB register), a parameter line memory 110, a register 104 for a top macroblock in an above neighboring macroblock pair (above-top MB register), a register 105 for a bottom macroblock in an above neighboring macroblock pair (above-bottom MB register), a distributor 120, a selector 130, a selector 131 and a condition judgment circuit 140. Description of each element is as follows.

The current MB register 101 holds coding (or decoding) parameter set for a current macroblock. Here, a parameter set indicates the conditions for coding or decoding a macroblock, such as a motion vector, a boundary strength of a deblocking filter, a frame/field structure, a reference index indicating a reference picture, a picture coding type (intra/inter coding), a quantization parameter QP, and indices for quantization processing $\alpha$ and $\beta$.

The left-top MB register 103 holds a parameter set of the top macroblock in a left neighboring macroblock pair, and is renewed with the parameter set stored in the current MB register 101 in order to reuse it as a parameter set of the top macroblock in a left neighboring macroblock pair.

Similarly, the left-bottom MB register 102 holds a parameter set of the bottom macroblock in a left neighboring macroblock pair, and is renewed with the parameter set stored in the current MB register 101 in order to reuse it as a parameter set of the bottom macroblock in a left neighboring macroblock pair.

The parameter line memory 110 temporarily holds the parameter sets stored in the current MB register 101 in order to reuse them as parameter sets for the above neighboring parameter pair.

The above-top MB register 104 holds a parameter set of the top macroblock in an above neighboring macroblock pair, and is renewed with the parameter set stored in the parameter line memory 110 in order to reuse it as a parameter set of the top macroblock in an above neighboring macroblock pair. Or it holds a parameter set of the top macroblock in a current macroblock pair, and is renewed with the parameter set stored in the current MB register 101 in order to reuse it as a parameter set of the top macroblock in a current macroblock pair.

The above-bottom MB register 105 holds a parameter set of the bottom macroblock in an above neighboring macroblock pair, and is renewed with the parameter set stored in the parameter line memory in order to reuse it as a parameter set for the bottom macroblock in an above neighboring macroblock pair.

The distributor 120 outputs the parameter set stored in the current MB register 101 to the left-bottom MB register 102 or the left-top MB register 103. The distributor 120 always outputs it to the selector 130 side when coding (or decoding) is performed on a macroblock basis, not on a macroblock pair basis.

The selector 130 selects, for the left-top MB register 103, one of the following: the parameter set distributed by the distributor 120 as the parameter set of the top macroblock in the left neighboring macroblock pair; and the parameter set stored in the above-top MB register 104.

The selector 131 selects, for the register 104, one of the following: the parameter set read out from the parameter line memory 110; and the parameter set stored in the current MB register 101.

The condition judgment circuit 140 judges the conditions for coding (or decoding) a current macroblock based on the parameter sets stored in the current MB register 101, the left-top MB register 103, the left-bottom MB register 102, the above-top MB register 104 and the above-bottom MB register 105.

The condition judgment necessary for image coding (or decoding) processing of a current macroblock is made based on the coding (or decoding) parameter set stored in the current MB register 101, the parameter sets stored in the registers 102 and 103 for the left neighboring macroblock pair and the parameter sets stored in the registers 104 and 105 for the above neighboring macroblock pair. In order to reuse the parameter set stored in the current MB register 101 as a parameter set of a neighboring macroblock of a macroblock to be processed next, after the condition judgment necessary for image coding (or decoding) processing of a current macroblock is completed, FIG. 9 shows the following two types of paths: one in which the parameter set stored in the current MB register 101 is saved, as a parameter set of a macroblock in a left neighboring macroblock pair, immediately after the condition judgment of the current macroblock is completed; and the other in which the parameter set stored in the current MB register 101 is once stored into the parameter line memory 110, as a parameter set of a macroblock in an above neighboring macroblock pair, and then read out from the parameter line memory 110 within the processing of two macroblock lines at longest and transferred to the registers 104 or 105 for the above neighboring macroblock pair.

Figure 1:
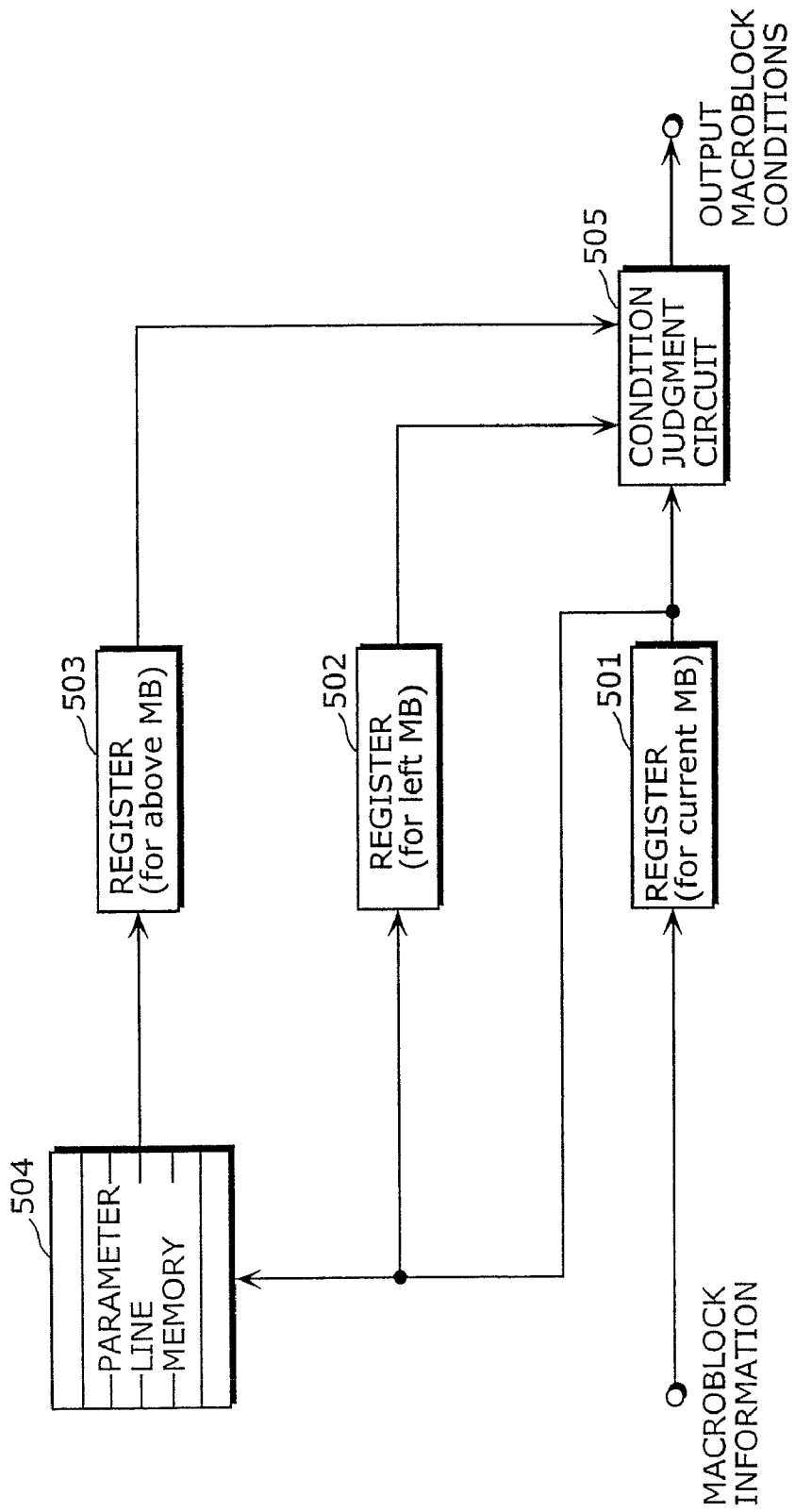
FIG. 1 is a diagram showing a structure of a conventional data holding apparatus.
Figure 2:
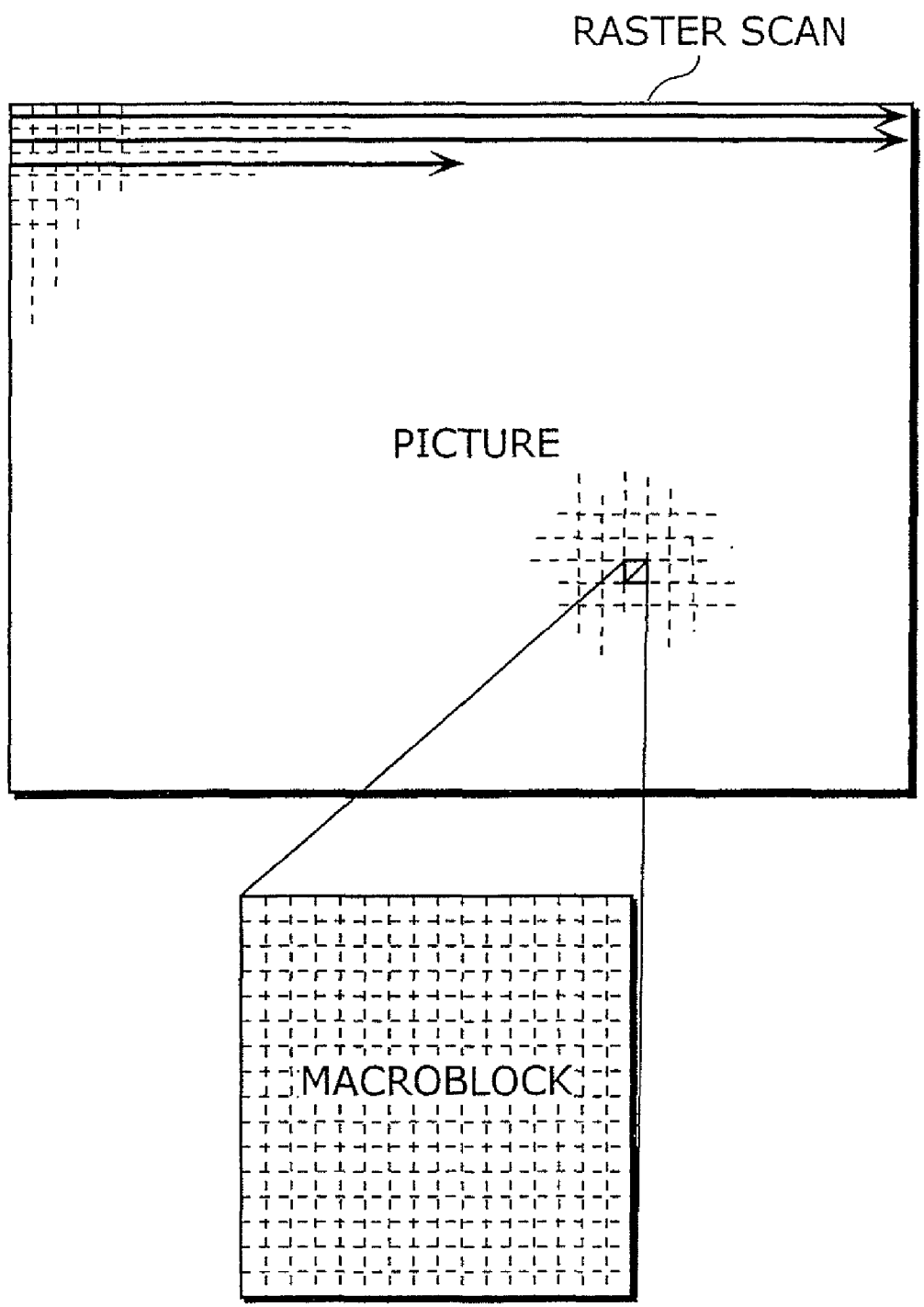
FIG. 2 is a diagram showing a conventional processing order of macroblocks.
Figure 3:
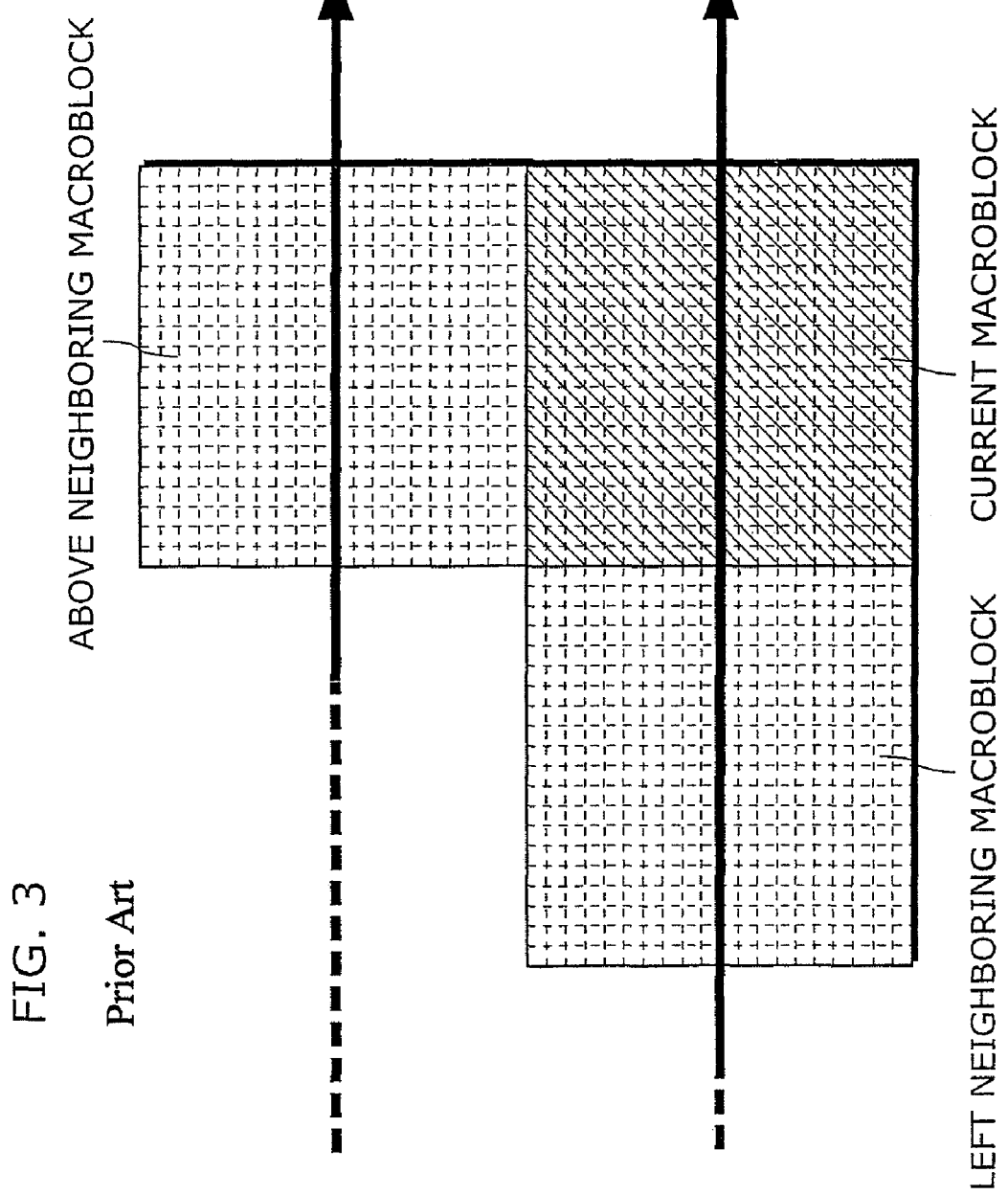
FIG. 3 is a diagram showing a conventional relationship between a current macroblock and its neighboring macroblocks.
Figure 4:
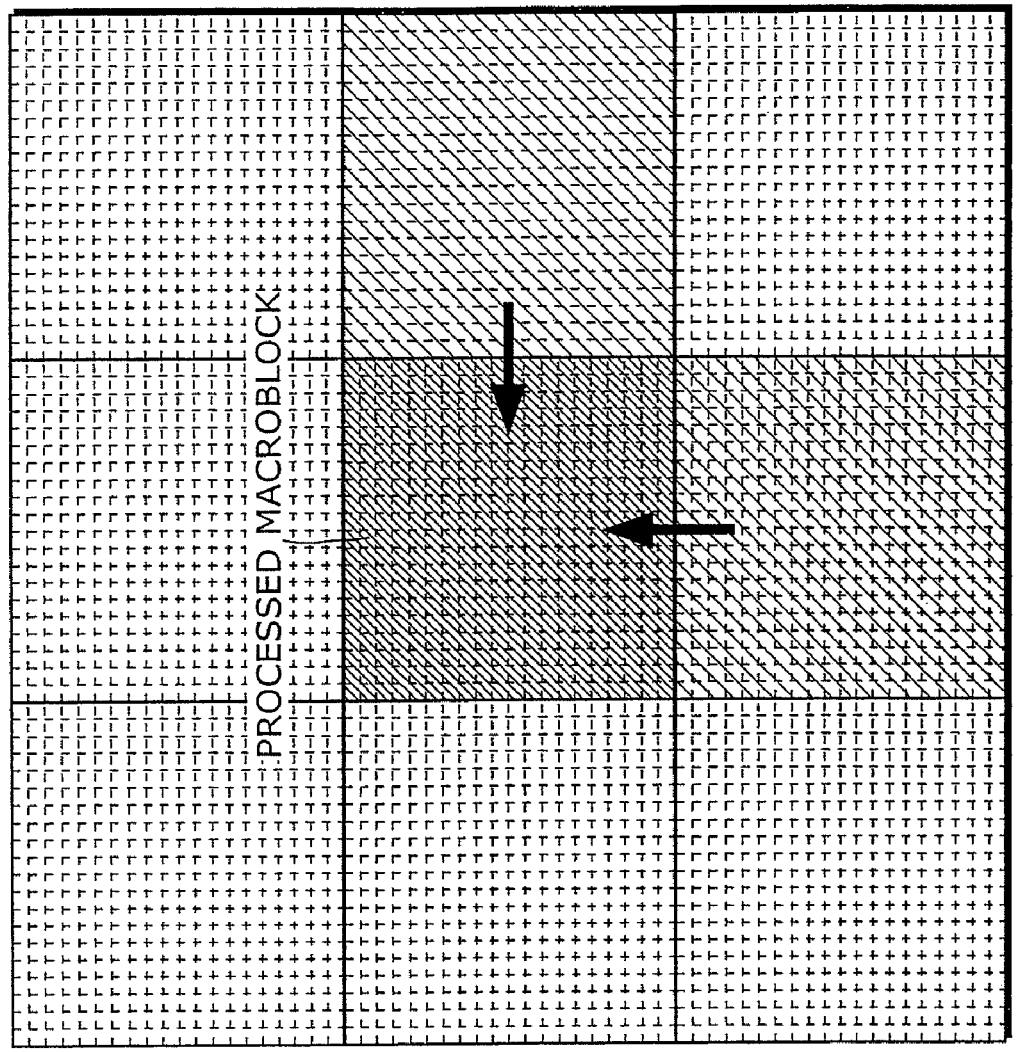
FIG. 4 is a diagram showing a conventional relationship between current macroblocks and their neighboring macroblocks.

In such circuit structure as described above, when the processing of a current macroblock is completed on a macroblock basis, as shown in FIG. 4, not on a macroblock pair basis, and the macroblock immediately right of or immediately below that current macroblock is to be coded (or decoded) as a next current macroblock, the coding (or decoding) parameter set of the current macroblock is needed again as a parameter set of the left neighboring or above neighboring macroblock. Image coding (or decoding) processing is generally performed from left to right and from top to bottom according to the raster scan order, as shown in FIG. 2 or 3. Therefore, the parameter set of the current macroblock is in a reusable state, as a parameter set of a left neighboring macroblock, immediately after the processing of the current macroblock is completed. On the other hand, the parameter set of the current macroblock is once saved into the parameter line memory 110, as a parameter set of an above neighboring macroblcok, at least for a period from the end of the processing of a current macroblock until the end of the processing of the following one macroblock line, because this parameter set is not used for that period.

Figure 5:
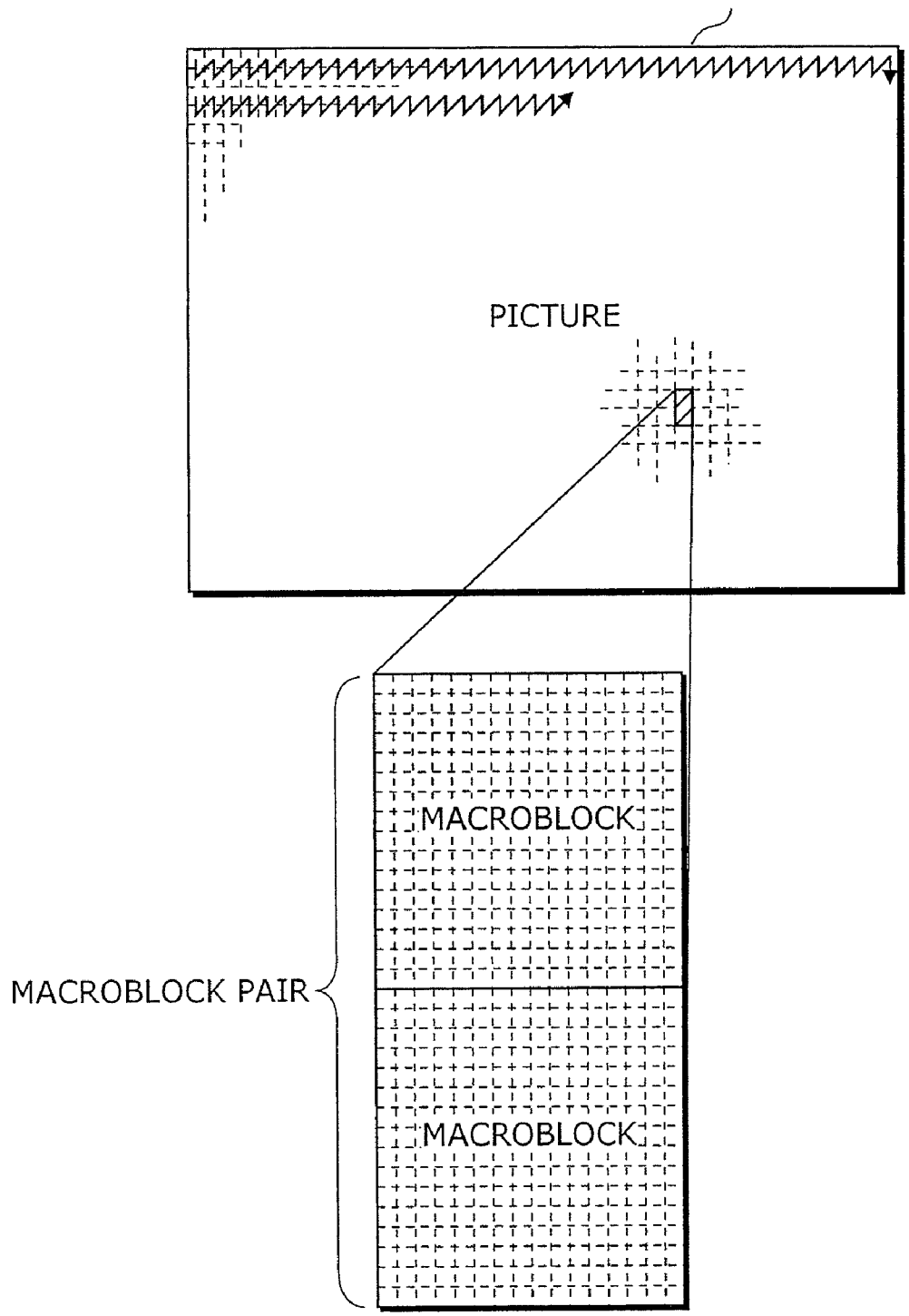
FIG. 5 is a diagram showing a processing order of macroblocks.
Figure 6:
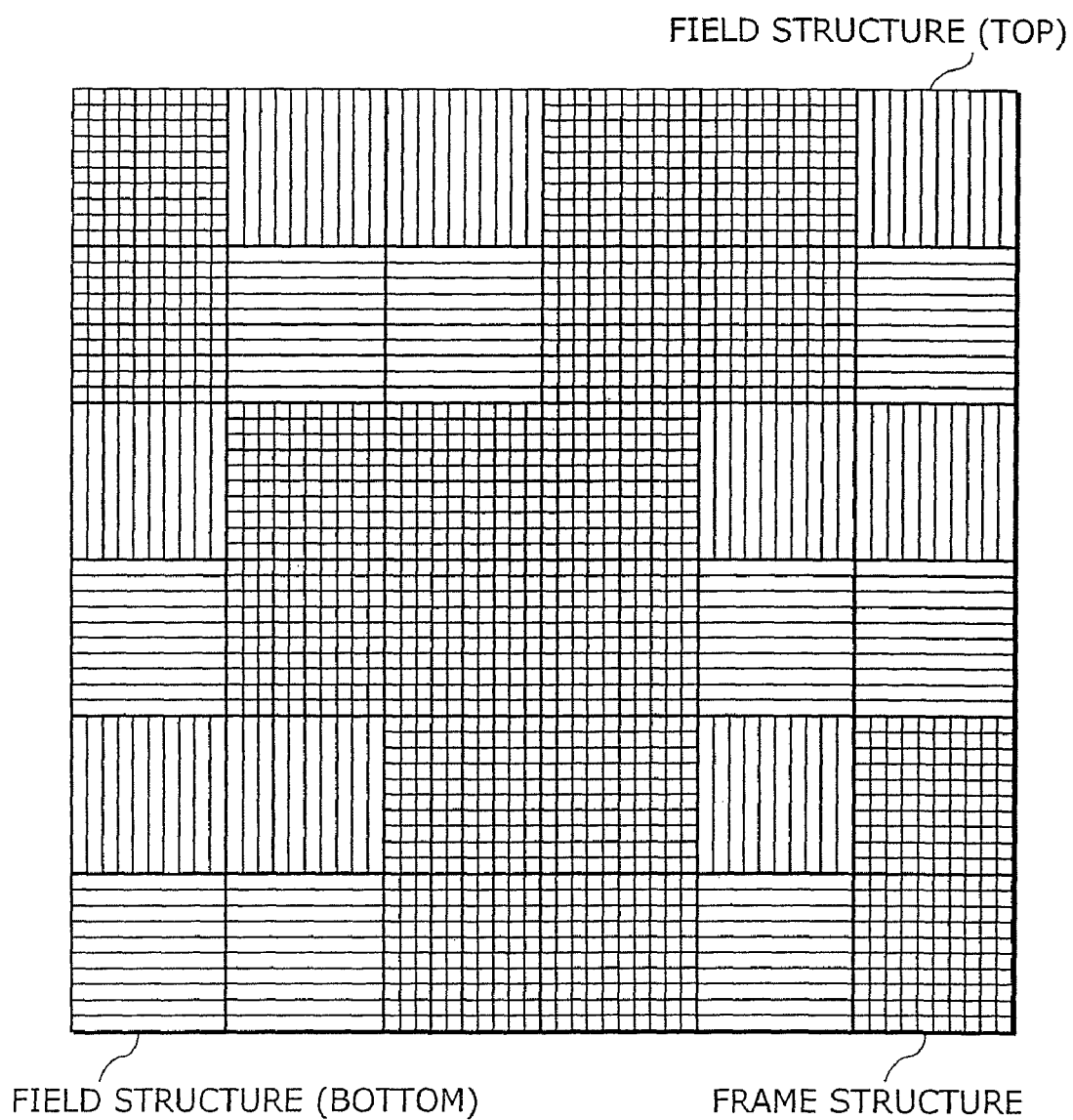
FIG. 6 is a diagram showing a relationship between current macroblocks and their neighboring macroblocks.
Figures 7A, 7B, 7C, 7D, 7E, 7F, 7G, 7H:
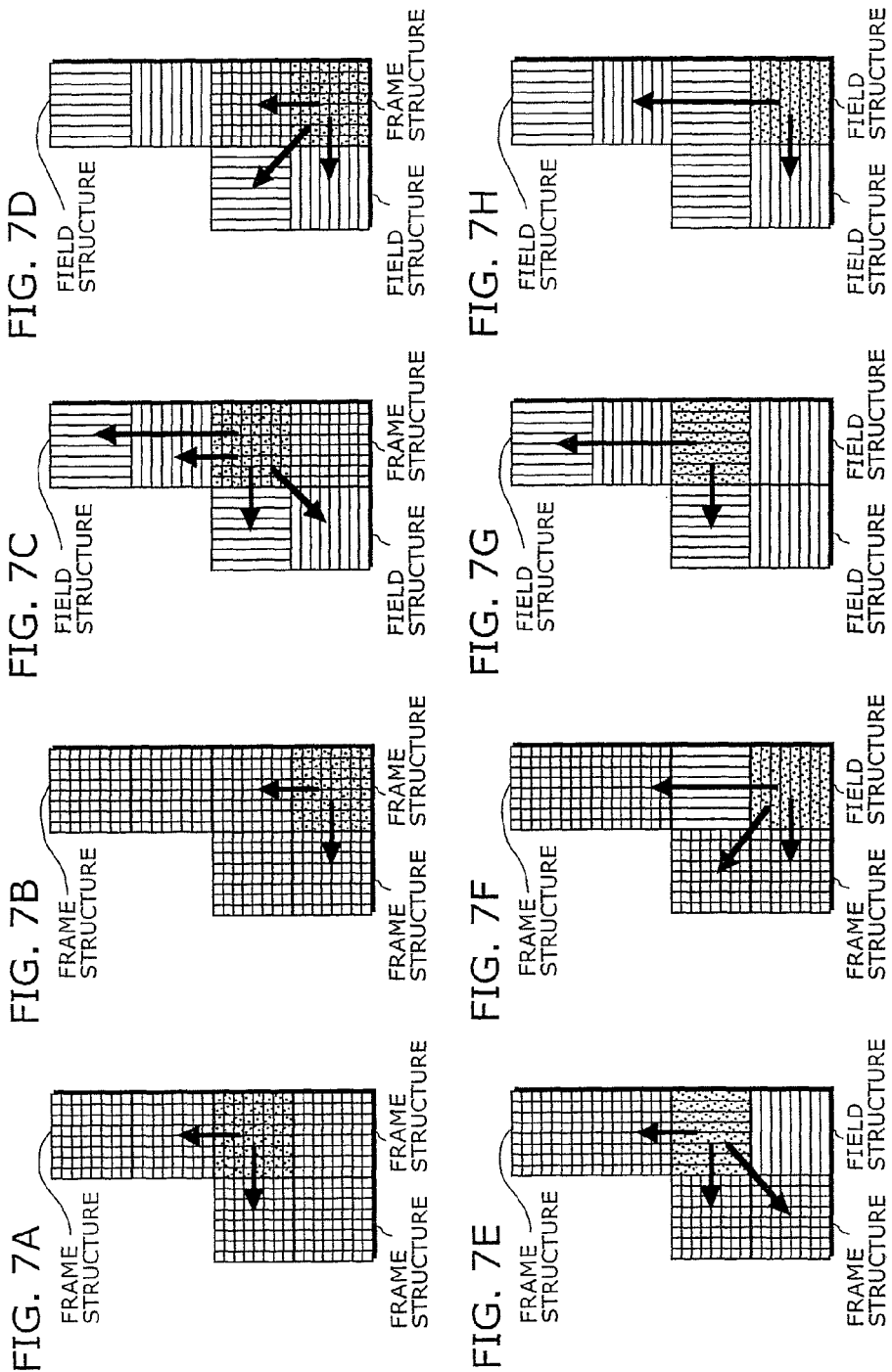
FIGS. 7A to 7H are diagrams showing various relationships between respective current macroblocks and their neighboring macroblocks.
Figure 8:
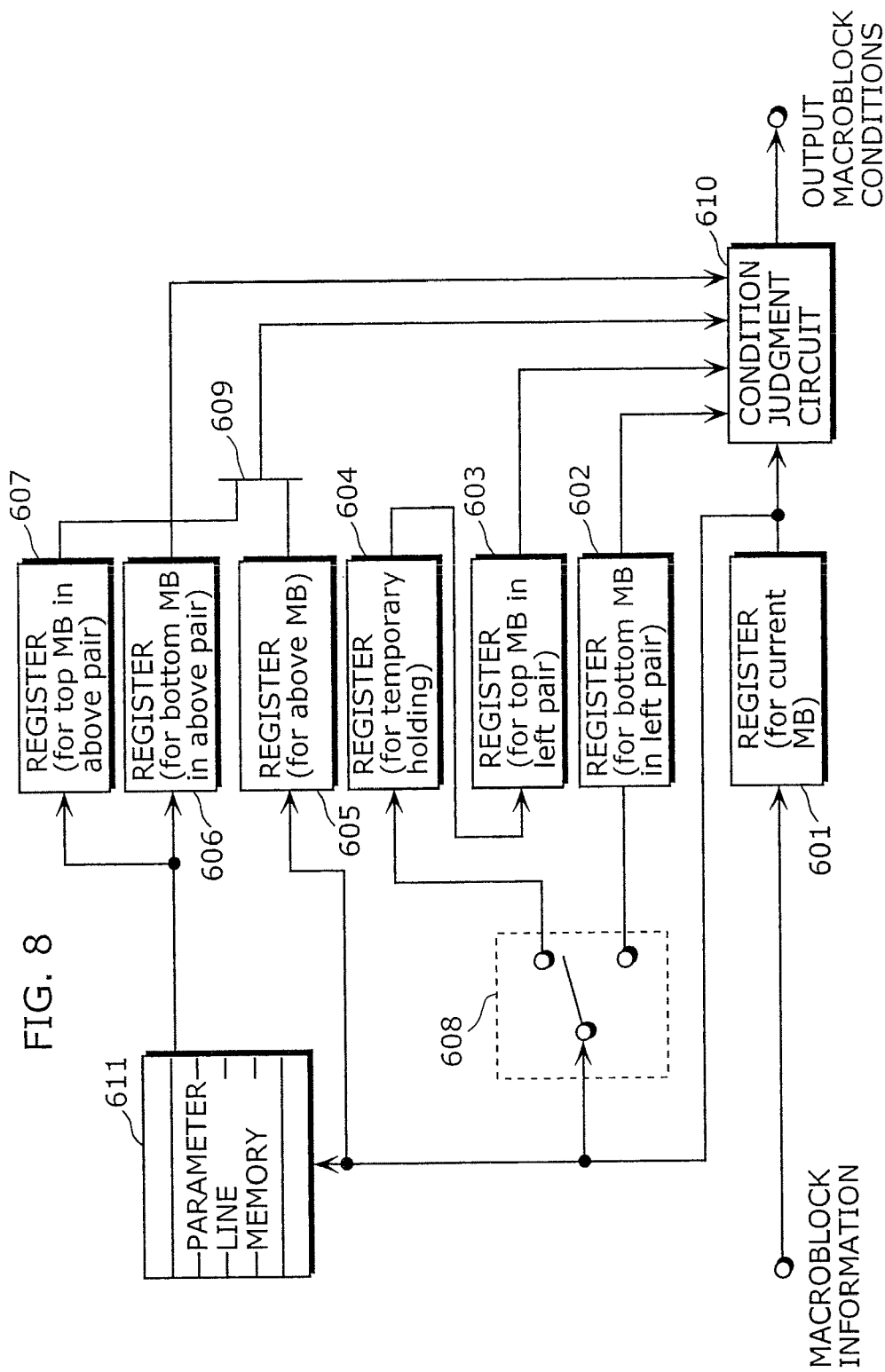
FIG. 8 is a diagram showing another example of a data holding apparatus.

For example, H. 264/MPEG-4 AVC allows the encoder (or the decoder) to select a vertical pair of macroblocks, as shown in FIG. 5, as a basic coding (or decoding) unit. It also allows the encoder (or the decoder) to switch the coding (or decoding) structure between a frame structure and a field structure adaptively for each vertical pair of macroblocks in a frame as shown in FIG. 6. Therefore, a current macroblock has the macroblocks which have various neighboring relationships therewith as shown in FIGS. 7A to 7H.

In order to support such relationships, the condition judgment circuit 140 also plays a role in judging not only the conditions for image coding (or decoding) but also the structural relationship between a current macroblock pair and each of its neighboring macroblock pairs as well as the positional relationship between the current macroblock and each of its neighboring macroblocks which varies depending on the position of the current macroblock in the current macroblock pair.

In order to save and store the parameter sets for image coding (or decoding) which have been stored in the current MB register 101, based on the structural and positional relationships between the current macroblock and its neighboring marcoblocks, the distributor 120, the selectors 130 and 131 switch among two registers 102 and 103 for left neighboring macroblock pair and two registers 104 and 105 for above neighboring macroblok pair.

For example, if a current macroblock is the top macroblock in the current macroblock pair, the parameter set of this current macroblock is once stored in the above-top MB register 104, and then stored into the left-top register 103, because this parameter set, which is stored in the current MB register 101 after the coding (or decoding) of the current macroblock is completed, is reused, as a parameter set of the left neighboring macroblock, for the processing of the second subsequent macroblock to the current macroblock, in consideration of the scanning order shown in FIG. 5. Therefore, the condition judgment circuit 140 outputs a switching signal so that the parameter set stored in the register 101 is written into the register 104 in advance via the selector 131. Since this operation inevitably leads the parameter set of the current macroblock to be reused as a parameter set of the above neighboring macroblock for coding (or decoding) the immediately subsequent macroblock in consideration of the scanning order shown in FIG. 5, the parameter set which has been saved into the above-top MB register 104 can be reused as it is.

As described above, in the case where a current macroblock is the top macroblock in the current macroblock pair, the above-top MB register 104 can renew the parameter set of the current macroblock, because, in consideration of the scanning order shown in FIG. 5, the macroblock to be processed next is the bottom macroblock in the current macroblock pair and the next macroblock that is the bottom macroblock in the current macroblock pair never uses the parameter set of the top macroblock in the above neighboring macroblock pair, as clearly shown in FIGS. 7A to 7H. On the other hand, the parameter set of the current macroblock is once saved into the parameter line memory 110 because it is reused, as a parameter set of the top macroblock in the above neighboring macroblock pair, one macroblock pair line later at earliest, in consideration of the scanning order shown in FIG. 5.

Next, if a current macroblock is the bottom macroblock in the current macroblock pair, the parameter set of this current macroblock is directly stored into the left-bottom MB register 102 because this parameter set is stored in the current MB register 101 after the coding (or decoding) of the current macroblock is completed and reused as the parameter set of the left neighboring macroblock for the processing of the second subsequent macroblock to the current macroblock, in consideration of the scanning order shown in FIG. 5. As such, the parameter set of the current macroblock does not need to be saved into the above-top MB register 104, because the macroblock to be processed next is the top macroblock in the right neighboring macroblock pair, as shown in FIG. 5, and therefore the parameter set of the current macroblock is immediately needed as the parameter set of the bottom macroblock in the left neighboring macroblock pair. On the other hand, the parameter set of the current macroblock is once saved into the parameter line memory 110 because it is reused, as the parameter set of the bottom macroblock in the above neighboring macroblock pair, one macroblock pair line later at earliest, in consideration of the scanning order shown in FIG. 5.

As described above, the parameter set of the left neighboring macroblock is saved into the register for the neighboring macroblock because it is needed for the processing of the second subsequent macroblock to the current macroblock at latest. However, the parameter set of the above neighboring macroblock is once saved into the parameter line memory 110 because it is needed for the processing of a macroblock one macroblock line later at earliest, and then this saved parameter set is transferred to the above-top MB register 104 or the above-bottom MB register 105 from the parameter line memory 110 when it is needed as the parameter set of the macroblock in the above neighboring macroblock pair.

Now, in the case where a current macroblock is the top macroblock in the current macroblock pair, the condition judgment circuit 140 outputs a switching signal to the selector 131 so that the parameter set of the top macroblock, among the parameter sets of the above neighboring macroblock pair which have been read from the parameter line memory 110 immediately before the processing of the current macroblock, is stored into the above-top MB register 104. On the other hand, the parameter set of the bottom macroblock is stored into the above-bottom MB register 105 as it is.

Next, in the case where a current macroblock is the bottom macroblock in the current macroblock pair, the parameter set stored in the current register is stored into the above-top MB register 104 because the parameter set stored in the above-top MB register 104 is not needed for the following processing, as mentioned above. On the other hand, as the parameter set has already been stored in the above-bottom MB register 105 when the current macroblock was the top macroblock in the current macroblock pair, the same parameter set may be transferred to the above-bottom MB register 105 from the parameter line memory 110, or there is no particular need to renew the parameter set stored in the above-bottom MB register 105.

The above-mentioned operation is repeated in this manner every time the position of a current macroblock changes in sequence.

As described above, the data holding apparatus of the present embodiment fulfills its function with only five registers, namely the current MB register 101 and the registers 102 to 105, which achieves suppression of increase in circuit size, in contrast to the conventional data holding apparatus requiring seven registers.

Second Embodiment

Figure 10:
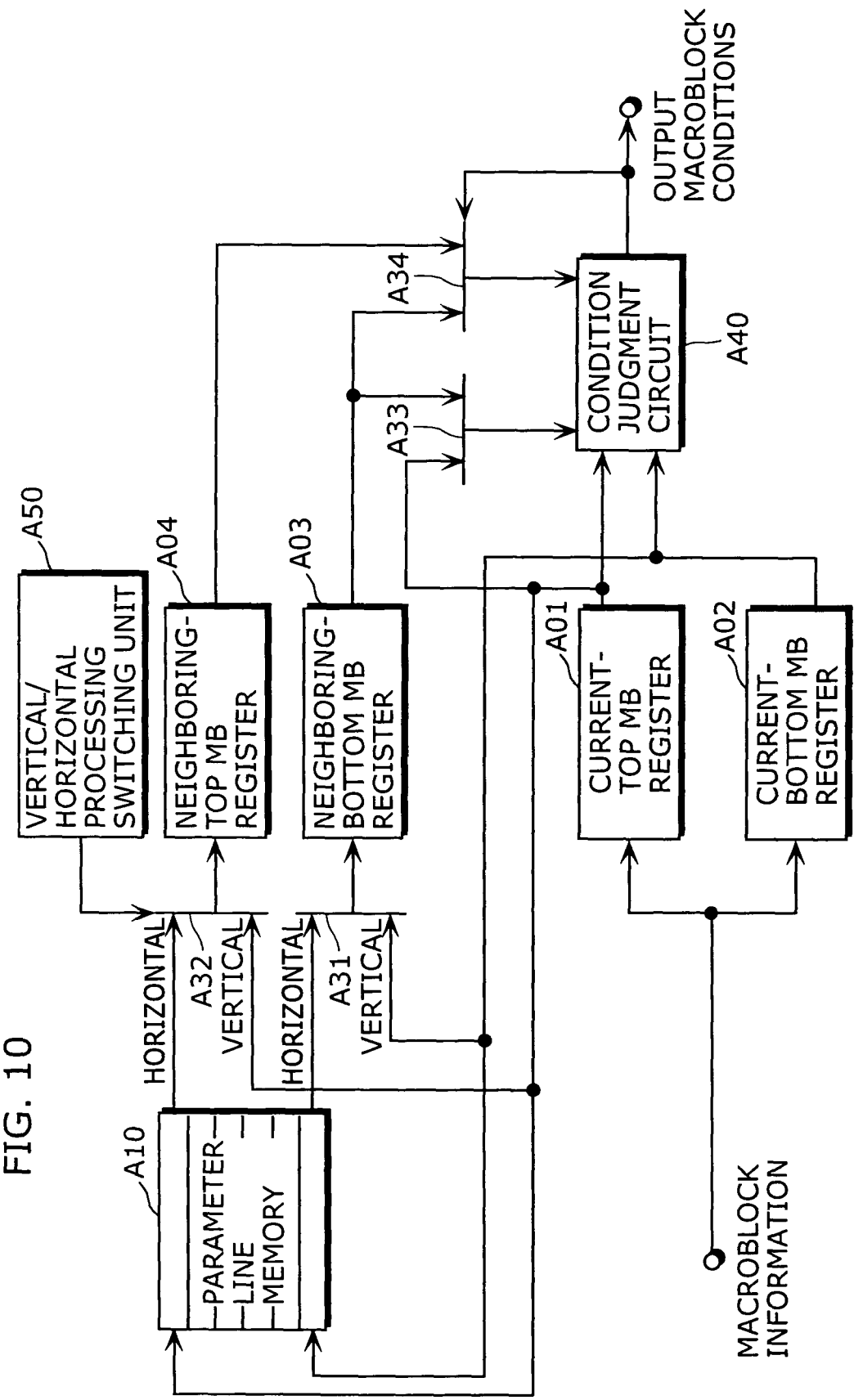
FIG. 10 is a diagram showing a structure of a data holding apparatus in a second embodiment of the present invention.

FIG. 10 is a diagram showing a data holding apparatus in the second embodiment of the present invention. The data holding apparatus shown in this diagram includes a current-top MB register A01, a current-bottom MB register A02, a neighboring-bottom MB register A03, a neighboring-top MB register A04, a parameter line memory A10, selectors A31 to A34, a condition judgment circuit A40 and a vertical/horizontal processing switching unit A50.

The current-top MB register A01 holds the parameter set of the top macroblock in a macroblock pair containing a current macroblock (hereinafter referred to as a current macroblock pair).

The current-bottom MB register A02 holds the parameter set of the bottom macroblock in a current macroblock pair.

The neighboring-bottom MB register A03 holds the parameter set of the bottom macroblock among the parameter sets in the macroblock pair selected by the selector A31.

The neighboring-top MB register A04 holds the parameter set of the top macroblock among the parameter sets in the macroblock pair selected by the selector A32.

The parameter line memory A10 temporarily holds the parameter sets of the coded or decoded macroblocks corresponding to at least two macroblock lines.

When a vertical processing/horizontal processing signal outputted from the vertical/horizontal processing switching unit A50 is switched from horizontal processing to vertical processing (namely, a current macroblock pair is switched to the next one), the selector A31 selects the output from the current-bottom MB register A02 which holds the parameter set of the bottom macroblock in the immediately preceding current macroblock pair, and outputs it to the neighboring-bottom MB register A03. Then, when the vertical processing/horizontal processing signal is switched from vertical processing to horizontal processing, the selector A31 selects, from the parameter sets stored in the parameter line memory A10, the parameter set of the bottom macroblock in the macroblock pair neighboring to the current macroblock pair, and outputs it to the neighboring-bottom MB register A03.

When the vertical processing/horizontal processing signal outputted from the vertical/horizontal processing switching unit A50 is switched from horizontal processing to vertical processing, the selector A32 selects the output from the current-top MB register A01 which holds the parameter set of the top macroblock in the immediately preceding current macroblock pair, and outputs it to the neighboring-top MB register A04. Then, when the vertical processing/horizontal processing signal is switched from vertical processing to horizontal processing, the selector A32 selects, from the parameter sets stored in the parameter line memory A10, the parameter set of the bottom macroblock in the macroblock pair neighboring to the current macroblock pair, and outputs it to the neighboring-top MB register A04.

The condition judgment circuit A40 judges the conditions for coding (or decoding) processing on a current macroblock based on the respective parameters outputted from the current-top MB register A01, the current-bottom MB register A02 and the selectors A33 and A34.

The selector A33 selects one of the outputs from the current-top MB register A01 and the neighboring-bottom MB register A03, depending on the result of the condition judgment by the condition judgment circuit A40, and outputs the selected one to the condition judgment circuit A40.

The selector A34 selects one of the outputs from the neighboring-bottom MB register A03 and the neighboring-top MB register A04, and outputs the selected one to the condition judgment circuit A40.

The vertical/horizontal processing switching unit A50 generates a vertical processing/horizontal processing signal for specifying, on a current macroblock pair basis, the timing of horizontal processing and vertical processing in coding or decoding thereof.

Figure 11:
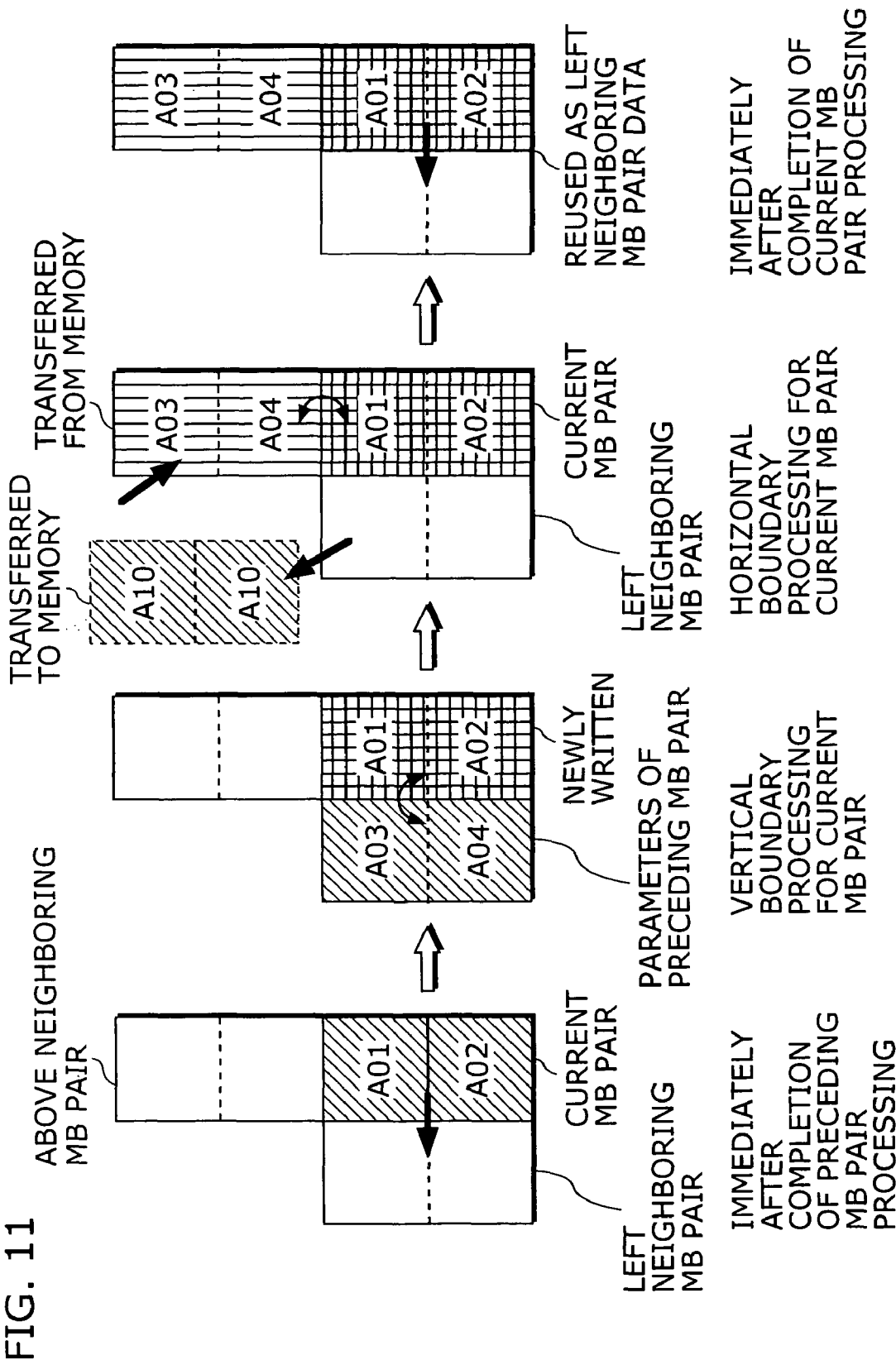
FIG. 11 is an explanatory diagram showing an order of transferring parameter sets.

FIG. 11 an explanatory diagram showing, in time sequence, corresponding relationships between the above-mentioned registers A01 to A04 shown in FIG. 10 and macroblocks. In this diagram, firstly, the parameter sets of the top and bottom macroblocks in a current macroblock pair are held in the current-top MB register A01 and the current-bottom MB register A02 immediately after the completion of the immediately preceding current macroblock pair processing.

Secondly, when the current macroblock pair transits to the right neighboring macroblock pair, the vertical processing/horizontal processing signal outputted from the vertical/horizontal processing switching unit A50 is switched from horizontal processing to vertical processing. As a result, the parameter sets which have been held in the current-top MB register A01 and the current-bottom MB register A02 are respectively transferred to the neighboring-top MB register A04 and the neighboring-bottom MB register A03 via the selectors A32 and A31. In this state, the condition judgment circuit A40 judges the conditions for, for example, vertical boundary processing. According to this condition judgment, vertical boundary processing is performed in image coding (or decoding).

Thirdly, when the vertical processing/horizontal processing signal outputted from the vertical/horizontal processing switching unit A50 is switched from vertical processing to horizontal processing, the parameter sets in the neighboring-top MB register A04 and the neighboring-bottom MB register A03 are saved into the parameter line memory A10. In addition, the parameter sets of the top and bottom macroblocks in the macroblock pair immediately above the current macroblock pair are transferred from the parameter line memory A10 to the neighboring-top MB register A04 and the neighboring-bottom MB register A03. In this state, the condition judgment circuit A40 judges the conditions for horizontal boundary processing. According to this condition judgment, horizontal boundary processing is performed in image coding (or decoding).

Fourthly, the processing state is returned to the state of immediately after the completion of the processing of the current macroblock pair. The above-described processing is repeated on a macroblock pair basis.

As described above, according to the data holding apparatus in the present embodiment, the registers A01 and A02 hold the parameter sets of two macroblocks in a macroblock pair containing a current macroblock, namely the parameter sets of each macroblock pair. Likewise, the registers A04 and A03 for neighboring macroblock pair also hold the parameter sets of each macroblock pair. In addition, the registers A04 and A03 selectively hold, in sequence, the parameter sets in a macroblock pair immediately left of a current macroblock and the parameter sets in a macroblock pair immediately above the current macroblock, via the selectors A32 and A31. In other words, these registers can be used, in time sequence, for both a left neighboring macroblock pair and an above neighboring macroblock pair.

The neighboring-top MB register A04 can be used, in time sequence, for both the top macroblock in a left neighboring macroblock pair and the top macroblock in an above neighboring macroblock pair. The neighboring-bottom MB register A03 can be used, in time sequence, for both the bottom macroblock in a left neighboring macroblock pair and the bottom macroblock in an above neighboring macroblock pair.

The above-mentioned operation is repeated in this manner every time the position of a current macroblock pair changes.

The above-mentioned time-series division of coding (or decoding) processing and shared use of registers A03 and A04 for neighboring macroblock pairs which hold the parameter sets of a left neighboring macroblock pair and the parameter sets of an above neighboring macroblock pair in the present embodiment can be applied to the processing of the data holding apparatus for macroblock pairs as described in the first embodiment if only it includes registers for macroblock pairs.

Third Embodiment

FIG. 12 is a diagram showing a structure of a data holding apparatus in the third embodiment of the present invention. This data holding apparatus includes: a register 901 for a current macroblock (current register 901) which holds the parameters specific to each of two macroblocsks in a macroblock pair; a register 902 for a current macroblock (current register 902) which holds the parameters common to both macroblocks in a macroblock pair; a switch 950; a register 904 for a top macroblock in a left neighboring macroblock pair (left-top MB register 904); a register 903 for a bottom macroblock in a left neighboring macroblock pair (left-bottom MB register 903); a parameter line memory 910; a register 905 for a top macroblock in an above neighboring macroblock pair (above-top MB register 905); a register 906 for a bottom macroblock in an above neighboring macroblock pair (above-bottom MB register 906); a switch 951; a distributor 920; a selector 930; a selector 931 and a condition judgment circuit 940. Description of the function of each element is as follows.

The current register 901 holds the parameters of a current macroblock in a macroblock pair, among the coding (or decoding) parameter set of the current macroblock.

The current register 902 holds the parameters common to the macroblocks in a macroblock pair, among the coding (or decoding) parameter set of the current macroblock.

The switch 950 enables the current register 902 to be written with the parameters only at the timing of transition from one macroblock pair to another, in order to prevent overwriting of wrong parameters into the current register 902 because the parameters to be stored in the current register 902 vary from one macroblock pair to another.

The left-top MB register 904 holds a parameter set of the top macroblock in a left neighboring macroblock pair, and is renewed with the parameters stored in the current registers 901 and 902 so as to reuse them as the parameter set of the top macroblock in a left neighboring macroblock pair.

Similarly, the left-bottom MB register 903 holds a parameter set of the bottom macroblock in a left neighboring macroblock pair, and is renewed with the parameters stored in the current registers 901 and 902 so as to reuse them as the parameter set of the bottom macroblock in a left neighboring macroblock pair.

The parameter line memory 910 temporarily holds the parameters stored in the current register 901 and 902 so as to reuse them as the parameter set of an above neighboring macroblock pair.

The above-top MB register 905 holds a parameter set of the top macroblock in an above neighboring macroblock pair, and is renewed with the parameter set stored in the parameter line memory 910 so as to reuse it as the parameter set of the top macroblock in an above neighboring macroblock pair. Or it holds a parameter set of the top macroblock in a current macroblock pair, and is renewed with the parameters stored in the current registers 901 and 902 so as to reuse them as the parameter set of the top macroblock in a current macroblock pair.

Similarly, the above-bottom MB register 906 holds a parameter set of the bottom macroblock in an above neighboring macroblock pair, and is renewed with the parameter set stored in the parameter line memory 910 so as to reuse it as the parameter set of the bottom macroblock in an above neighboring macroblock pair.

The switch 951 enables a register to be written with the parameter set of the bottom macroblock in an above neighboring macroblock pair only at the timing of transition from one macroblock pair to another, in order to prevent overwriting of wrong parameter sets into the register because the parameter sets to be stored into the register vary from one macroblock pair to another.

The distributor 920 outputs the parameters stored in the current registers 901 and 902 to either the left-top MB register 904 or the left-bottom MB register 903.

The selector 930 outputs, to the left-top MB register 904, either the parameter set distributed by the distributor 920 as the parameter set of the top macroblock in a left neighboring macroblock pair or the parameter set stored in the above-top MB register 905.

The selector 931 outputs, to the above-top MB register 905, either the parameter set read from the parameter line memory 910 or the parameters stored in the current registers 901 and 902.

The condition judgment circuit 940 judges the conditions for coding (or decoding) of a current macrloblock based on the parameter sets stored in the current registers 901 and 902, the left-top MB register 904, the left-bottom MB register 903, the above-top MB register 905 and above-bottom MB register 906.

FIG. 12 shows the structure including the following elements in addition to the above-described structure of the first embodiment: the register 902 which holds the parameters given on a macroblock pair basis among the coding (or decoding) parameter set of a current macroblock; the switch 950 for preventing renewal of the parameters in the register 902 which holds the parameters given on a macroblock pair basis, at the timing at which a current macroblock pair does not transit; and the switch 951 for preventing renewal of the parameters in the above-bottom register 906 at the timing at which a current macroblock pair does not transit.

In such circuit structure, as described in the first embodiment, the condition judgment circuit 940 judges not only the conditions for image coding (or decoding) but also the structural relationship between a current macroblock pair and each of its neighboring macroblock pairs as well as the positional relationship between the current macroblock and each of its neighboring macroblocks which varies depending on the position of the current macroblock in the current macroblock pair. And the distributor 920 and the selectors 930 and 931 switch between the registers so that the parameters for image coding (or decoding) stored in the current registers are saved selectively into any one of the two registers for left neighboring macroblock pair and any one of the two registers for above neighboring macroblock pair, depending on the structural and positional relationships between the current macroblock and its neighboring macroblocks. At the same time, the switches 950 and 951 are turned ON by the control signal outputted from the condition judgment circuit 940 so that the parameters are stored into the register 902 at the timing of transition from one current macroblock pair to another, namely, only when a current macroblock is the top macroblock in a current macroblock pair.

For example, in the case where a current macroblock is the top macroblock in a current macroblock pair, the parameters of this current macroblock are once saved into the above-top MB register 905 and then stored into the left-top register 904, because these parameters, which are stored in the current registers after the coding (or decoding) of the current macroblock is completed, are reused as the parameter set of the left neighboring macroblock for the processing of the second subsequent macroblock to the current macroblock, in consideration of the scanning order shown in FIG. 5. Therefore, the condition judgment circuit 940 outputs a switching signal so that the parameter set is written into the register 905 in advance via the selector 931. Since this operation inevitably leads the parameter set of the current macroblock to be reused as the parameter set of the above neighboring macroblock for coding (or decoding) the immediately subsequent macroblock in consideration of the scanning order shown in FIG. 5, the parameter set which has been saved into the left-top MB register 905 can be reused as it is.

As described above, in the case where a current macroblock is the top macroblock in a current macroblock pair, the above-top MB register 905 can hold the parameter set of the current macroblock because, in consideration of the scanning order shown in FIG. 5, the macroblock to be processed next is the bottom macroblock in the current macroblock pair and the next macroblock that is the bottom macroblock in the current macroblock pair never uses the parameter set of the top macroblock in the above neighboring macroblock pair, as clearly shown in FIGS. 7A to 7H. On the other hand, the parameter set of the current macroblock is once saved into the parameter line memory 910 because it is reused as the parameter set of the top macroblock in the above neighboring macroblock pair, one macroblock pair line later at earliest, in consideration of the scanning order shown in FIG. 5.

Next, if a current macroblock is the bottom macroblock in the current macroblock pair, the parameter set of this current macroblock is directly stored into the left-bottom MB register 903 because the parameters, which has been stored in the current registers 901 and 902 after the completion of coding (or decoding) of the current macroblock, is reused as the parameter set of the left neighboring macroblock for the processing of the second subsequent macroblock to the current macroblock, in consideration of the scanning order shown in FIG. 5. As such, the parameter set of the current macroblock does not need to be saved into the above-top MB register 905 as in the above case, because the macroblock to be processed next is the top macroblock in the right neighboring macroblock pair, as shown in FIG. 5, and therefore the parameter set of the current macroblock is immediately needed as the parameter set of the bottom macroblock in the left neighboring macroblock pair. On the other hand, the parameter set of the current macroblock is once saved into the parameter line memory 910 because it is reused, as the parameter set of the bottom macroblock in the above neighboring macroblock pair, one macroblock pair line later at earliest, in consideration of the scanning order shown in FIG. 5.

As described above, the parameter set of the current macroblock is saved into the left-top MB register 904, as a parameter set of the top macroblock in the left neighboring macroblock pair, because it is needed for the processing of the second subsequent macroblock to the current macroblock at latest. However, the parameter set of the current macroblock is once saved into the parameter line memory 910, as a parameter set of the top macroblock in the above neighboring macroblock pair, because it is needed for the processing of a macroblock one macroblock line later at earliest, and then this saved parameter set is transferred to the above-top register 905 or the above-bottom register 906 from the parameter line memory 910 when it is needed as the parameter set of the above neighboring macroblock pair.

Now, in the case where a current macroblock is the top macroblock in the current macroblock pair, the condition judgment circuit 940 outputs a switching signal to the selector 931 so that the parameter set of the top macroblock, among the parameter sets in the above neighboring macroblock pair which have been read from the parameter line memory 910 immediately before the processing of the current macroblock, is stored into the register 905. On the other hand, the condition judgment circuit 940 outputs an ON signal to the selector 951 so that the parameter set of the bottom macroblock is stored into the register 906 as it is.

Next, in the case where a current macroblock is the bottom macroblock in the current macroblock pair, the parameter set stored in the above-top MB register 905 is not needed for the following processing, as mentioned above. The parameters stored in the current register 901 are saved into the above-top MB register 905 (when the current macroblock transits from top to bottom). On the other hand, the parameter set stored in the above-bottom MB register 906 is renewed when a macroblock pair transits, while it is not renewed when the macroblock pair does not transit. This is because the above-bottom MB register 906 needs to hold only the same parameter set in both cases where the current macroblock is the top macroblock and the bottom macroblock in the macroblock pair.

Therefore, the condition judgment circuit 940 outputs an OFF signal to the switch 951 when a macroblock transits but a macroblock pair does not transit. As a result, it becomes possible to prevent wrong parameter set from being overwritten into the register 906 when the macroblock transits but the macroblock pair does not transit.

As described above, since the data holding apparatus of the present embodiment allows renewal of parameters specific to each macroblock on a macroblock basis and renewal of parameters common to both macroblocks in the macroblock pair on a macroblock pair basis, it becomes possible to eliminate wasteful data transfer. In addition, since the data holding apparatus of the present embodiment prevents the common parameters from being overwritten with wrong parameters, it becomes possible to store the common parameters in the register without juding, in the upper layer (such as CPU and DSP), whether there are common parameters or not, and thus reduce the number of steps of a program.

The present invention is applicable to a coding apparatus and a decoding apparatus for coding and decoding images, and a data holding apparatus included in such coding apparatus and decoding apparatus. It is applicable to a Web server for distributing moving images, a network terminal for receiving them, a digital camera having a moving image recording/reproducing function, a camera-equipped cellular phone, a DVD recorder/player, a digital TV, a PDA, a personal computer and the like.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A data holding apparatus used for image processing in which an image is coded or decoded, on a macroblock basis, based on a field structure or a frame structure selected on a macroblock pair basis, said data holding apparatus comprising:
   a current register which holds a parameter set of a current macroblock to be coded or decoded; and
   registers which respectively hold parameter sets of macroblocks having neighboring relationships with the current macroblock,
   wherein at least one of said registers selectively holds, in sequence, parameter sets of respective different macroblocks having the neighboring relationships, one parameter set at a time,
   wherein said registers include:
   a first register which selectively holds one of a parameter set of a top macroblock in an above neighboring macroblock pair with respect to the current macroblock, and a parameter set of a top macroblock in a current macroblock pair containing the current macroblock;
   a second register which holds a parameter set of a bottom macroblock in the above neighboring macroblock pair with respect to the current macroblock;
   a third register which holds a parameter set of a top macroblock in a left neighboring macroblock pair with respect to the current macroblock; and
   a fourth register which holds a parameter set of a bottom macroblock in the left neighboring macroblock pair with respect to the current macroblock,
   wherein said first register holds the parameter set of the top macroblock in the current macroblock pair when the current macroblock is a bottom macroblock in the current macroblock pair, and the parameter set of the top macroblock in the above neighboring macroblock pair when the current macroblock is a top macroblock in the current macroblock pair.

2. The data holding apparatus according to claim 1,
   wherein the current macroblock repeats a first transition and a second transition alternately,
   the first transition is a transition of the current macroblock from a top macroblock to a bottom macroblock in a macroblock pair,
   the second transition is a transition of the current macroblock from a bottom macroblock in a macroblock pair to a top macroblock in a right neighboring macroblock pair,
   said data holding apparatus further comprises:
   a parameter memory which holds parameter sets of at least two macroblock lines of coded or decoded macroblocks; and
   a first selector which selects, at the first transition, the parameter set output from said current register, and, at the second transition, a parameter set of a top macroblock in an above neighboring macroblock pair with respect to a macroblock to be coded or decoded immediately after the second transition, from the parameter sets output from said current register, and outputs the selected parameter set to said first register.

3. The data holding apparatus according to claim 2, further comprising
   a second selector which selects, at the first transition, the parameter set output from said first register, and, at the second transition, a parameter set of a top macroblock in a left neighboring macroblock pair with respect to the macroblock to be coded or decoded immediately after the second transition, from the parameter sets, output from said current register, and outputs the selected parameter set to said third register.

4. The data holding apparatus according to claim 1,
   wherein said current register further holds a parameter set of a non-current macroblock in the current macroblock pair containing the current macroblock,
   said data holding apparatus further comprises:
   a parameter line memory which holds parameter sets of at least two macroblock lines of coded or decoded macroblocks;
   a controller which generates, for each current macroblock pair, a timing signal for specifying horizontal processing or vertical processing in coding or decoding processing; and
   a selector which selects said current register which holds the parameter sets in the current macroblock pair, according to the timing signal from said controller, and then selects parameter sets of the above neighboring macroblock pair with respect to the current macroblock pair, from the parameter sets held in said parameter line memory, and
   said registers hold the parameter sets of the macroblock pair selected by said selector.

5. A data holding apparatus used for image processing in which an image is coded or decoded, on a macroblock basis, based on a field structure or a frame structure selected on a macroblock pair basis, said data holding apparatus comprising:
   a current register which holds a parameter set of a current macroblock to be coded or decoded; and
   registers which respectively hold parameter sets of macroblocks having neighboring relationships with the current macroblock, wherein at least one of said registers selectively holds, in sequence, parameter sets of respective different macroblocks having the neighboring relationships, one parameter set at a time, wherein the current macroblock repeats a first transition and a second transition alternately, the first transition is a transition of the current macroblock from a top macroblock to a bottom macroblock in a macroblock pair, the second transition is a transition of the current macroblock from a bottom macroblock in a macroblock pair to a top macroblock in a right neighboring macroblock pair, a parameter set includes parameters common to two macroblocks in a macroblock pair and parameters specific to each of the two macroblocks, said current register comprises: a common register which holds the common parameters; and a specific register which holds the specific parameters, and said data holding apparatus further comprises a switch which turns off to stop data input into said common register at the first transition and turns on to allow data input at the second transition, wherein said registers include:

a first register which selectively holds one of a parameter set of a top macroblock in an above neighboring macroblock pair with respect to the current macroblock, and a parameter set of a top macroblock in a current macroblock pair containing the current macroblock;

a second register which holds a parameter set of a bottom macroblock in the above neighboring macroblock pair with respect to the current macroblock;

a third register which holds a parameter set of a top macroblock in a left neighboring macroblock pair with respect to the current macroblock; and a fourth register which holds a parameter set of a bottom macroblock in the left neighboring macroblock pair with respect to the current macroblock, wherein said first register holds the parameter set of the top macroblock in the current macroblock pair when the current macroblock is a bottom macroblock in the current macroblock pair, and the parameter set of the top macroblock in the above neighboring macroblock pair when the current macroblock is a top macroblock in the current macroblock pair.

6. The data holding apparatus according to claim 5, further comprising:

a parameter memory which holds parameter sets of at least two macroblock lines of coded or decoded macroblocks; and a first selector which selects, at the first transition, the parameter set output from said current register, and, at the second transition, a parameter set of a top macroblock in an above neighboring macroblock pair with respect to a macroblock to be coded or decoded immediately after the second transition, from the parameter sets held in said parameter memory, and outputs the selected parameter set to said first register.

7. The data holding apparatus according to claim 6, further comprising a second selector which selects, at the first transition, the parameter set output from said first register, and, at the second transition, a parameter set of a top macroblock in a left neighboring macroblock pair with respect to a macroblock to be coded or decoded immediately after the second transition, from the parameter sets output from said current register, and outputs the selected parameter set to said third register.

* * * * *